Patented Nov. 20, 1934

1,981,398

UNITED STATES PATENT OFFICE

1,981,398

CELLULOSE ORGANIC ESTER COMPOSITION CONTAINING AN ESTER OF TETRAHYDROFURFURYL ALCOHOL

Ernest R. Taylor and Henry B. Smith, Rochester, N. Y., assignors to Eastman Kodak Company, Rochester, N. Y., a corporation of New York No Drawing. Application November 21, 1932, Serial No. 643,730

6 Claims. (Cl. 106—40)

This invention relates to compositions of matter in which cellulose organic esters, such as cellulose acetate, are combined or mixed with other substances, such as a compatible plasticizer, with or without a common solvent for both, and with or without other useful addition agents, so that the resulting product will have properties such as will make the composition highly advantageous for use in the plastic and analogous arts, such, for instance, as the manufacture of wrapping sheets or tissue, photographic film, molding compounds and products, and the like.

One object of this invention is to produce compositions of matter which may be made into permanently transparent, strong and flexible sheets or films of desired thinness which are substantially waterproof, are unaffected by ordinary photographic fluids and possess the desired properties of a support for sensitive photographic coatings. Still another object is to produce compositions which can be molded at elevated temperatures and high pressures to produce plastic products having the desirable properties of celluloid. Other objects will become apparent to those skilled in the art to which this invention pertains.

While cellulose acetate has been known for decades, it has also been known that to utilize it in the various plastic arts it is necessary to mix therewith such plasticizing or conditioning agents as triphenyl phosphate, monochlornaphthalene or the like. Certain of these and other addition agents are also added for the purpose of reducing the inflammability of the product. Plastic inducing agents, such as the higher alcohols and their esters, are sometimes also added. Similarly, addition compounds of various kinds have been employed to increase flexibility, transparency, toughness and other properties which will enhance the value of the resulting product. While the plasticizers or other addition agents heretofore discovered have had their utility in the art, the increasing use to which cellulose acetate has been put and the increasing number of desirable properties required of cellulose acetate for most purposes have made the discovery of new and economical plasticizers or other addition agents a matter of considerable importance to the art. This has been a problem of some difficulty, since many of the nitrocellulose solvents are not solvents for cellulose acetate, and many substances which act as plasticizers for nitrocellulose are not sufficiently compatible with cellulose acetate to be used as plasticizers in cellulose acetate compositions.

We have discovered that valuable properties may be induced in and/or contributed to compositions containing organic esters of cellulose, such as cellulose acetate, by adding thereto as a plasticizing compound an ester of tetrahydrofurfuryl alcohol containing less than 10 carbon atoms in the acid radical, such as the acetate, propionate, butyrate, caproate, benzoate, phthalate, maleate, lactate or salicylate of tetrahydrofurfuryl alcohol. The particularly useful properties which these compounds induce in or contribute to cellulose organic ester compositions containing them are hereinafter enumerated. Some of these esters have been described in the literature. All of them may be prepared by the methods described in the co-pending application of Wm. W. Hartman and Jos. B. Dickey, Serial No. 643,729 filed of even date herewith.

In order that those skilled in this art may better understand our invention we would state, by way of illustration, that for the manufacture of photographic film or other sheets our new compositions of matter may be compounded as follows: 100 parts of acetone-soluble cellulose acetate, i. e. cellulose acetate containing from 36% to 42% acetyl radical, approximately, is dissolved with stirring at atmospheric temperature in 300 to 500 parts, preferably 400 parts, by weight, of acetone. To this solution may be added from 10 to 50 parts by weight of any of the tetrahydrofurfuryl esters mentioned above. Within the limits stated, the amount of plasticizer may be decreased or increased, depending upon whether it is desired to decrease or increase, respectively, the properties which these plasticizers contribute to the finished product. The amount of solvent employed may also be increased or decreased, depending upon whether it is desired to have a more or less freely flowing composition, respectively.

A composition of matter prepared as above described may be deposited upon any suitable film-forming surface to form a film or sheet, in a manner well known to those skilled in the art. A film so produced has permanently brilliant transparency and low inflammability, burning no more readily than ordinary newsprint. Films or sheets produced in accordance with our invention are tough and flexible. For instance, films of cellulose acetate plasticized with from 10% to 50% (10–50 parts by weight based on the cellulose acetate) of tetrahydrofurfuryl butyrate had an initial flexibility of from 100% to 500% greater than that of film containing no plasticizer, films containing from 10% to 50% of tetrahydrofurfuryl benzoate had an initial flexibility of from 35% to 535% greater than that of film containing no plasticizer and films containing from 10% to 50% of tetrahydrofurfuryl caproate had an initial flexibility of from 65% to 735% greater than that of film containing no plasticizer. Furthermore, film so plasticized maintains flexibility in a superior fashion. For instance, films containing from 10% to 50% of tetrahydrofurfuryl caproate maintained flexibility at 65° C. for over 121 days, films containing from 10 to 50% of tetrahydrofurfuryl acetate or from 10 to 50% of tetrahydrofurfuryl propionate maintained flexibility at 65° C. for over 198 days, and films containing 50% of tetrahydrofurfuryl salicylate maintained flexibility at 65° C. for over 220 days, whereas an unplasticized film became brittle in 30 days. This indicates that films so plasticized will withstand ordinary usage satisfactorily for many years.

Other similar solvents (instead of acetone) which are compatible with the cellulose acetate and our new plasticizers will also occur to those skilled in this art, such as ethylene chloride-alcohol mixtures. In fact, certain higher esters of tetrahydrofurfuryl alcohol which are not compatible with cellulose acetate in acetone solution, such as tetrahydrofurfuryl laurate, may be incorporated in limited amounts with cellulose acetate in ethylene chloride-alcohol solution to give clear films. In like manner our novel plasticizers may be compounded with other single organic esters of cellulose, such as cellulose propionate, butyrate, stearate and the like, or with mixed organic esters, such as cellulose aceto-stearate, cellulose aceto-propionate, cellulose aceto-butyrate, cellulose aceto-lactate, cellulose aceto-tartrate or the like, a suitable solvent which will dissolve both the cellulosic derivative and the plasticizer being employed, such, for instance, as an alkylene chloride with or without the addition of alcohol.

The esters of tetrahydrofurfuryl alcohol containing less than 10 carbon atoms in the acid radical may also be advantageously used as plasticizers in cellulose acetate molding compositions. For instance, when about 30% (30 parts by weight based on the cellulose acetate) of any of the esters of tetrahydrofurfuryl alcohol containing less than 10 carbon atoms in the acid radical, such as the acetate, propionate, butyrate, caproate, benzoate, phthalate, maleate, lactate or salicylate of tetrahydrofurfuryl alcohol, is homogeneously mixed with cellulose acetate, the mixture may be converted into a hard, transparent or translucent plastic product by molding at a temperature of 130–170° C. and 2500 to 4000 pounds per square inch for a period of from 2 to 5 minutes, in a manner already known to those skilled in molding compounds of that nature.

What we claim as our invention and desire to be secured by Letters Patent of the United States is:

1. A composition of matter comprising cellulose acetate and tetrahydrofurfuryl caproate as a plasticizer therefor.

2. A composition of matter comprising a cellulose organic ester and tetrahydrofurfuryl caproate as a plasticizer therefor.

3. A transparent, flexible sheet comprising 100 parts of cellulose acetate and, as a plasticizer therefor, from about 10 to 50 parts by weight of tetrahydrofurfuryl caproate.

4. A molding composition adapted for molding under elevated temperatures and high pressures, comprising 100 parts of cellulose acetate, and from about 25 to 50 parts by weight of tetrahydrofurfuryl caproate.

5. A composition of matter comprising 100 parts of cellulose acetate and, as a plasticizer therefor, from about 10 to 50 parts of tetrahydrofurfuryl caproate.

6. A molding composition adapted for molding under elevated temperatures and high pressures, comprising cellulose acetate and tetrahydrofurfuryl caproate.

ERNEST R. TAYLOR.
HENRY B. SMITH.